United States Patent
Suchezky

(10) Patent No.: US 8,449,249 B2
(45) Date of Patent: May 28, 2013

(54) TURBINE NOZZLE APPARATUS AND ASSOCIATED METHOD OF MANUFACTURE

(75) Inventor: Mark E. Suchezky, South Lyon, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 656 days.

(21) Appl. No.: 12/757,946

(22) Filed: Apr. 9, 2010

(65) Prior Publication Data
US 2011/0250058 A1   Oct. 13, 2011

(51) Int. Cl.
*F04D 29/30* (2006.01)
*F04D 29/44* (2006.01)

(52) U.S. Cl.
USPC ............... 415/139; 415/191; 29/889.22

(58) Field of Classification Search
USPC .......... 415/115, 116, 139, 191, 193, 199.1, 415/199.2, 199.4, 199.5; 416/96 R, 96 A, 416/97 R; 29/889.22
See application file for complete search history.

(56) References Cited

U.S. PATENT DOCUMENTS

| | | | |
|---|---|---|---|
| 2,701,120 A * | 2/1955 | Stalker | 416/90 R |
| 3,301,527 A | 1/1967 | Kercher | |
| 3,700,348 A | 10/1972 | Corsmeier et al. | |
| 3,715,170 A | 2/1973 | Savage et al. | |
| 3,846,041 A | 11/1974 | Albani | |
| 3,966,357 A | 6/1976 | Corsmeier | |
| 3,973,874 A | 8/1976 | Corsmeier et al. | |
| 3,994,622 A | 11/1976 | Schultz et al. | |
| 4,790,721 A | 12/1988 | Morris et al. | |
| 5,259,730 A | 11/1993 | Damlis et al. | |
| 5,392,515 A | 2/1995 | Auxier et al. | |
| 5,797,725 A * | 8/1998 | Rhodes | 415/209.2 |
| 6,193,465 B1 | 2/2001 | Liotta et al. | |
| 6,318,963 B1 * | 11/2001 | Emery et al. | 416/96 A |
| 6,453,557 B1 | 9/2002 | Burdgick | |
| 6,561,757 B2 | 5/2003 | Burdgick et al. | |
| 6,652,220 B2 | 11/2003 | Powis et al. | |
| 6,893,217 B2 * | 5/2005 | Brainch et al. | 415/209.3 |
| 7,559,142 B2 | 7/2009 | Patel et al. | |
| 7,836,703 B2 * | 11/2010 | Lee et al. | 415/115 |
| 2004/0009066 A1 | 1/2004 | Soechting et al. | |
| 2010/0028143 A1* | 2/2010 | Bailey et al. | 415/202 |

* cited by examiner

*Primary Examiner* — Igor Kershteyn
(74) *Attorney, Agent, or Firm* — Raggio & Dinnin, P.C.

(57) ABSTRACT

A turbine nozzle is constructed from a plurality of associated circumferential turbine nozzle segments each of which incorporates at least one pre-formed annular-segment passage bounded at a first azimuthal boundary by a first portion of a first bounding nozzle vane, and at a second azimuthal boundary by a second portion of a second bounding nozzle vane, with the at least one pre-formed annular-segment passage therebetween, wherein when assembled in the turbine nozzle, a first portion of a first bounding nozzle vane of one circumferential turbine nozzle segment is joined to a second portion of a second bounding nozzle vane of another adjacent circumferential turbine nozzle segment so as to form therebetween a nozzle vane of the turbine nozzle, wherein the minimum through-flow area of the associated at least one pre-formed annular-segment passage is substantially unaffected by the assembly of the circumferential turbine nozzle segments to form the turbine nozzle.

41 Claims, 14 Drawing Sheets

TO FIG. 8b 54,54'

FROM FIG. 8a 54,56

TURBINE NOZZLE APPARATUS AND ASSOCIATED METHOD OF MANUFACTURE

BRIEF DESCRIPTION OF THE DRAWINGS

In the accompanying drawings:

FIG. 2b illustrates an edge view of the turbine nozzle illustrated in FIG. 2a;

DESCRIPTION OF EMBODIMENT(S)

Figure 1:
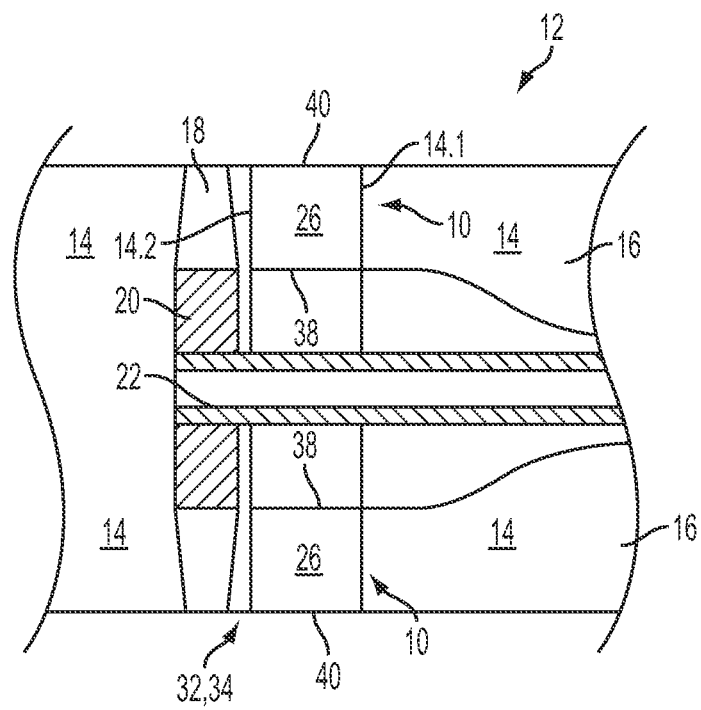
FIG. 1 illustrates a turbine nozzle used in an environment of a gas turbine engine.

Referring to FIG. 1, a turbine nozzle 10 illustrated in the environment of a gas turbine engine 12 provides for accelerating exhaust gases 14 generated in an associated combustion chamber 16 of the gas turbine engine 12 and for redirecting these exhaust gases 14 onto a plurality of turbine blades 18 of an associated turbine rotor 20 of the gas turbine engine 12 so as to provide for driving and rotating the turbine rotor 20, which in turn provides for driving an associated shaft 22 that provides shaft power for either or both driving an associated compressor or for output from the gas turbine engine 12.

Referring also to FIGS. 2a, 2b 3 and 4, the turbine nozzle 10 comprises a plurality of nozzle vanes 24 arranged around an annular region 26, wherein each nozzle vane 24 comprises an airfoil 28 having associated leading 28.1 and trailing 28.2 edges, and the nozzle vanes 24 is shaped and oriented so as to provide for redirecting the incoming stream 14.1 of exhaust gases 14 from the combustion chamber 16 through associated annular-segment passages 30 between the vanes 24 so that the resulting outgoing stream 14.2 of exhaust gases 14 exiting from a throat 32 of the turbine nozzle 10 at an outlet 34 thereof are directed in a direction 36 so as to cooperate with the turbine blades 18 so as to provide for generating torque on the turbine rotor 20 and shaft 22 responsive thereto. The annular-segment passages 30 between the vanes 24 are also bounded by inner 38 and outer 40 endwalls that may be shaped so as to provide for controlling the through-flow area 42 of each annular-segment passages 30 responsive to distance 44 along and through the annular-segment passage 30. For example, referring to FIG. 3, the outer endwall 40 is illustrated with an associated radius 46 that decreases with distance 44 along and through the annular-segment passage 30 so as to provide for locating the throat 32 of the turbine nozzle 10 at the outlet 34 thereof, wherein the throat 32 is the location of minimum through-flow area 42' along and through the annular-segment passage 30.

The size and shape of the annular-segment passages 30 has a significant affect on the operation of the turbine nozzle 10 with the turbine blades 18 of the turbine rotor 20. In particular, the minimum through-flow area 42' at the throat 32 of the turbine nozzle 10 is a principal performance parameter of the turbine nozzle 10, whereby the performance of separately manufactured different turbine nozzles 10, each having substantially the same minimum through-flow area 42' for each annular-segment passage 30, will be substantially the same as measured by the performance of an associated gas turbine engine 12 for different turbine nozzles 10 but under substantially the same operating conditions.

Figure 5:
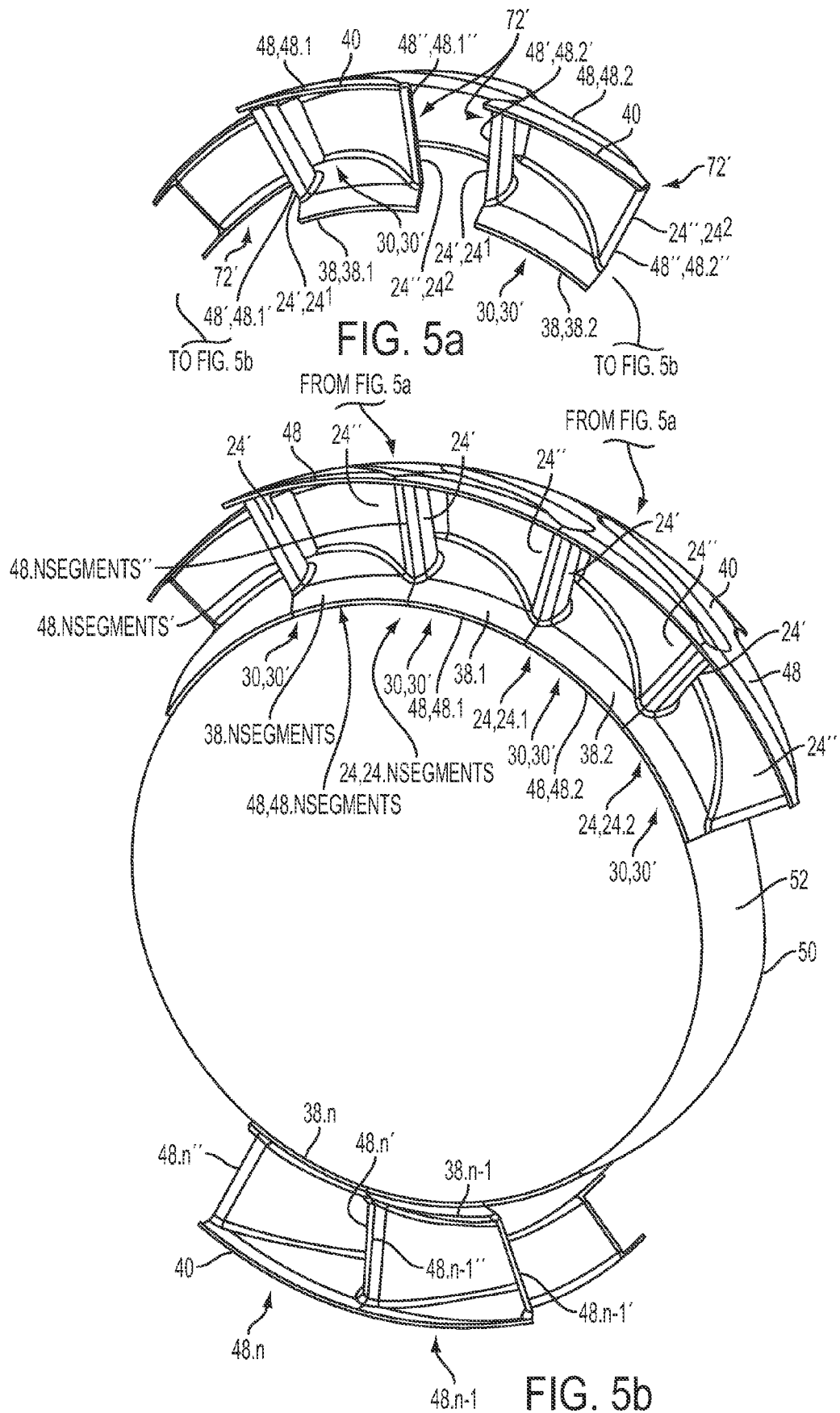
FIG. 5a illustrates a pair of adjacent circumferential turbine nozzle segments prior to the assembly thereof in an associated turbine nozzle.
FIG. 5b illustrates the assembly of circumferential turbine nozzle segments from FIG. 5a in an associated turbine nozzle.

Referring also to FIGS. 5a and 5b, the turbine nozzle 10 is manufacturable with substantially uniform minimum through-flow area 42' for each annular-segment passage 30 by assembling the turbine nozzle 10 from a plurality of circumferential turbine nozzle segments 48, wherein each circumferential turbine nozzle segment 48 has at least one pre-formed annular-segment passage 30' that is bounded at a first azimuthal boundary 48' by a first portion 24' of a first bounding nozzle vane $24^1$, and that is bounded at a second azimuthal boundary 48" by a second portion 24" of a second bounding nozzle vane $24^2$, wherein the first 24' and second 24" portions of different circumferential turbine nozzle segments 48 are shaped so as to form a single complete nozzle vane 24 when circumferentially abutted against and attached to one another. The flow characteristics of the turbine nozzle 10 are primarily predetermined by the pre-formed annular-segment passages 30' of the circumferential turbine nozzle segments 48 prior to their assemblage to form the turbine nozzle 10, wherein the assembly of the circumferential turbine nozzle segments 48 provides for defining the associated nozzle vanes 24 of the turbine nozzle 10 without more than insubstantially affecting the associated pre-formed annular-segment passages 30' that determine the flow characteristics of the turbine nozzle 10 and the performance thereof in cooperation with the turbine blades 18 of a turbine rotor 20 when incorporated in a gas turbine engine 12.

In accordance with one aspect, the turbine nozzle 10 is assembled from a plurality of circumferential turbine nozzle segments 48 by locating the circumferential turbine nozzle segments 48 around a central cylindrical mandrel 50, the outer surface 52 of which is shaped so as to conform to the shape of the inner endwalls 38 of the circumferential turbine nozzle segments 48, and assembling adjacent circumferential turbine nozzle segments 48 to one another so as to form the associated nozzle vanes 24 of the turbine nozzle 10. For example, a first circumferential turbine nozzle segment 48.1 having corresponding first 48.1' and second 48.1" azimuthal boundaries is located with its corresponding inner endwall 38.1 on the outer surface 52 of the central cylindrical mandrel 50. A second circumferential turbine nozzle segment 48.2 having corresponding first 48.2' and second 48.2" azimuthal boundaries is located with its corresponding inner endwall 38.2 on the outer surface 52 of the central cylindrical mandrel 50, and with the first azimuthal boundary 48.2' of the second circumferential turbine nozzle segment 48.2 abutting the second azimuthal boundary 48.1" of the first circumferential turbine nozzle segment 48.1 and joined to one another so as to form a corresponding first nozzle vane 24.1 of the turbine nozzle 10. For example, the adjacent first 48' and second 48" azimuthal boundaries of adjacent circumferential turbine nozzle segments 48 may be joined to one another by welding or brazing. Generally, an $n^{th}$ circumferential turbine nozzle segment 48.$n$ having corresponding first 48.$n$' and second 48.$n$" azimuthal boundaries is located with its corresponding inner endwall 38.$n$ on the outer surface 52 of the central cylindrical mandrel 50, and with the first azimuthal boundary 48.$n$' of the $n^{th}$ circumferential turbine nozzle segment 48.$n$ abutting and joined to the second azimuthal boundary 48.$(n-1)$" of the $(n-1)^{th}$ circumferential turbine nozzle segment 48.$(n-1)$, for n between 2 and $N_{segments}$ for a turbine nozzle 10 containing a total of $N_{segments}$ circumferential turbine nozzle segments 48. The $N_{segments}^{th}$ circumferential turbine nozzle segment 48.$N_{segments}$ having corresponding first 48.$N_{segments}$' and second 48.$N_{segments}$" azimuthal boundaries is located with its corresponding inner endwall 38.$N_{segments}$ on the outer surface 52 of the central cylindrical mandrel 50, and with the second azimuthal boundary 48.$N_{segments}$" of the $N_{segments}^{th}$ circumferential turbine nozzle segment 48.$N_{segments}$ abutting and joined to the first azimuthal boundary 48.1' of the first circumferential turbine nozzle segment 48.1 so as to form a corresponding $N_{segments}^{th}$ nozzle vane 24.$N_{segments}$. Accordingly, the turbine nozzle 10 is manufactured by first manufacturing the associated plurality of pre-formed annular-segment passages 30' embodied by the associated plurality of circumferential turbine nozzle segments 48, and then assembling and joining the plurality of circumferential turbine nozzle segments 48 so as to form the turbine nozzle 10, and in the process, thereby forming the associated plurality of nozzle vanes 24 thereof.

Figure 6:
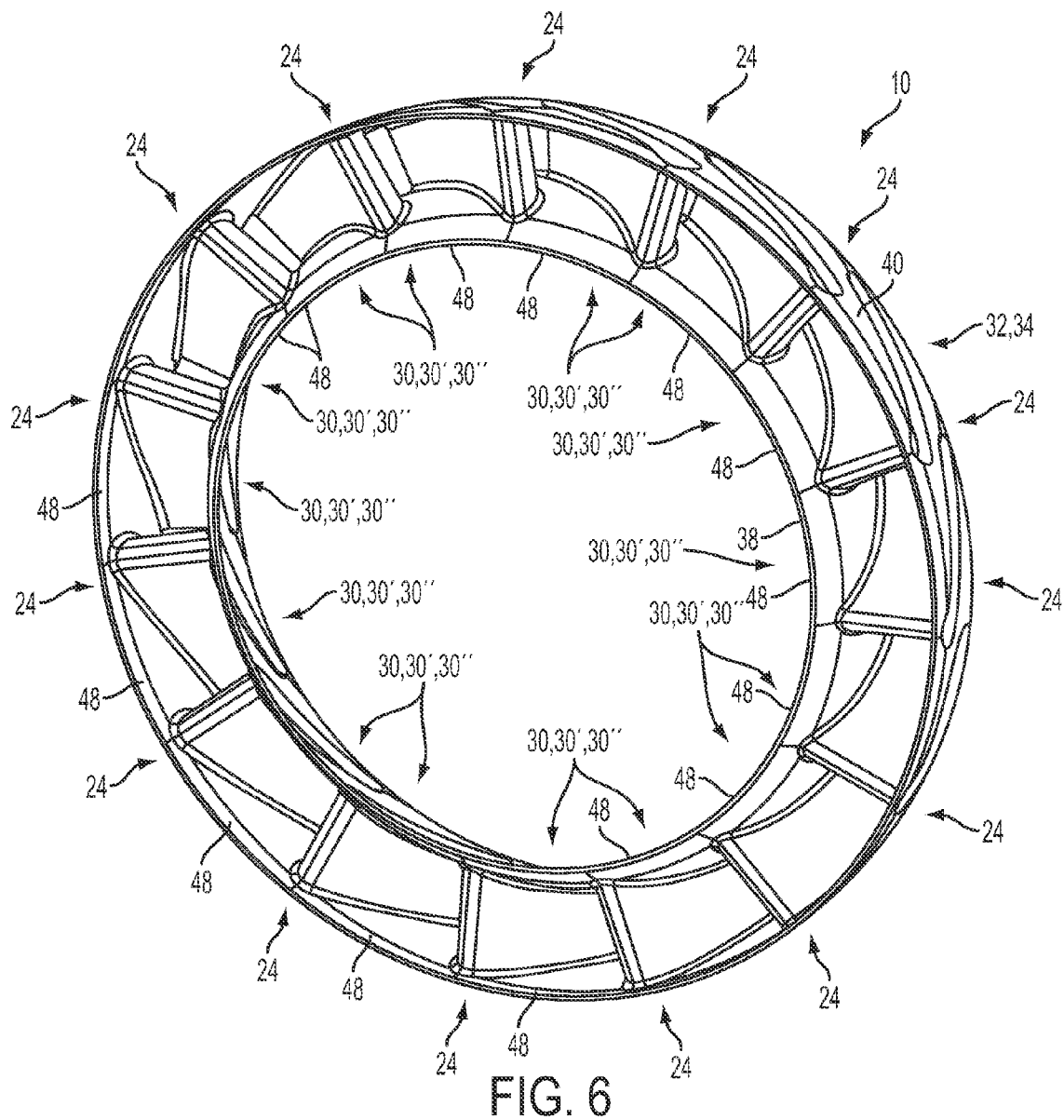
FIG. 6 illustrates a resulting turbine nozzle assembled from circumferential turbine nozzle segments.

Referring also to FIG. 6, accordingly, the turbine nozzle 10 is manufactured by first forming the negative spaces 30" between the nozzle vanes 24, and then forming the nozzle vanes 24 by joining the associated circumferential turbine nozzle segments 48 that collectively define these negative spaces 30", wherein these negative spaces 30" defined by the pre-formed annular-segment passage 30' of the circumferential turbine nozzle segments 48 determine the resulting flow characteristics of the turbine nozzle 10, resulting in a turbine nozzle 10 comprising a continuous inner endwall 38, a continuous outer endwall 40, and a plurality of nozzle vanes 24 or airfoils 28 therebetween. Tolerances in the process of assembling the circumferential turbine nozzle segments 48 to form the turbine nozzle 10 result in associated variability in the thickness of the associated nozzle vanes 24 rather than in the associated independently-formed pre-formed annular-segment passages 30' and the associated minimum through-flow areas 42' thereof that collectively constitute the throat 32 of the turbine nozzle 10. Accordingly, the variability in the minimum through-flow areas 42' of the pre-formed annular-segment passages 30' introduced during the manufacturing of each associated circumferential turbine nozzle segment 48 is not affected by assembly variability, wherein variability associated with manufacturing the circumferential turbine nozzle segments 48 can generally be more tightly controlled than can the variability that would result from otherwise assembling nozzle vanes 24 to form the turbine nozzle 10 if instead the nozzle vanes 24 had been first separately manufactured rather than the circumferential turbine nozzle segments 48. Accordingly, the turbine nozzle 10 assembled from a plurality of circumferential turbine nozzle segments 48 provides less variability in associated minimum through-flow area 42' of the associated throat 32 thereof, and less variability in the resulting performance of a gas turbine engine 12 when used therein, than would a turbine nozzle 10 assembled from a plurality of nozzle vanes 24. For example, a turbine nozzle 10 assembled from separately manufactured nozzle vanes 24 brazed to the inner 38 and outer 40 endwalls would be subject to variability in the size and shape of the braze alloy fillets formed at the junctions of the nozzle vanes 24 and the inner 38 and outer 40 endwalls that can cause an associated variability in the associated minimum through-flow area 42'.

Figure 7:
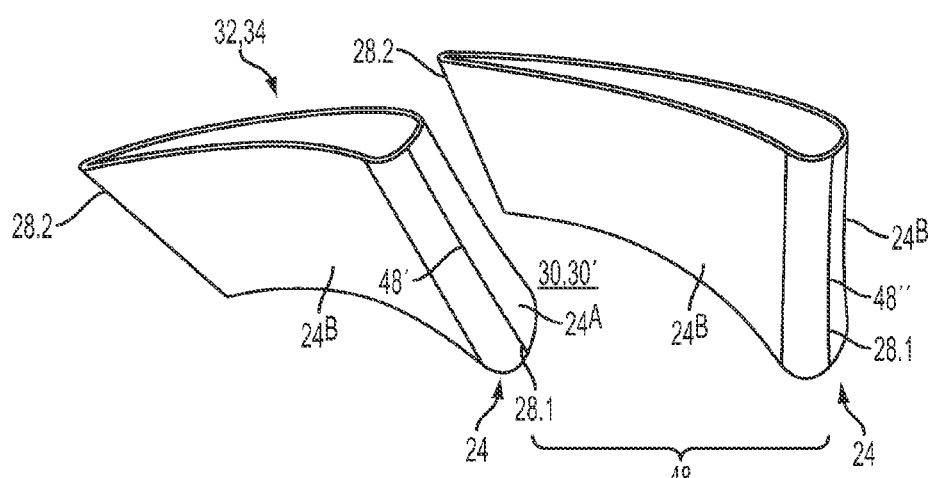
FIG. 7 illustrates an embodiment of first and second azimuthal boundaries of associated circumferential turbine nozzle segments through associated nozzle vanes.

Referring to FIG. 7, in accordance with one embodiment, the first 48' and second 48" azimuthal boundaries are located relative to the nozzle vanes 24 so that the associated first portion 24' of the first bounding nozzle vane $24^1$ constitutes a suction side $24^A$ of the first bounding nozzle vane $24^1$ and the second portion 24" of the second bounding nozzle vane $24^2$ constitutes a pressure side $24^B$ of the second bounding nozzle vane $24^2$ for each of the circumferential turbine nozzle segments 48 and associated nozzle vanes 24 of the turbine nozzle 10.

Figure 8A:
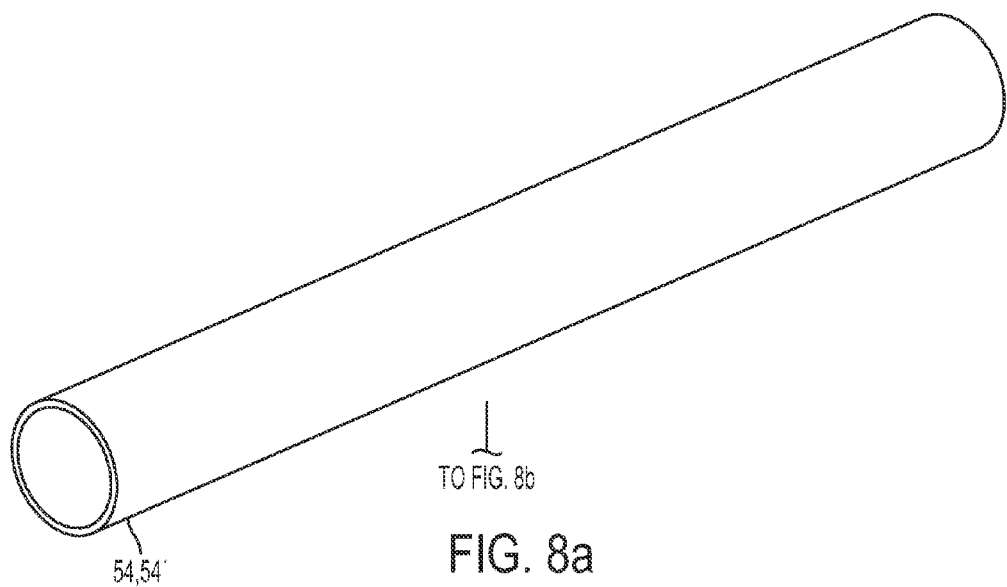
FIG. 8a illustrates a pre-cut piece of tubular material used in a process to hydroform an associated circumferential turbine nozzle segment.
Figure 8B:
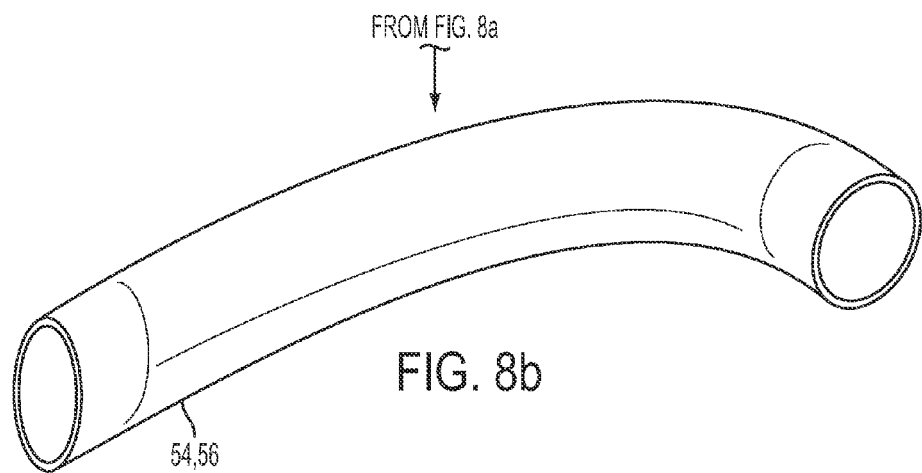
FIG. 8b illustrates a pre-form from the pre-cut tubular material illustrated in FIG. 8a used in a process to hydroform an associated circumferential turbine nozzle segment.
Figure 9:
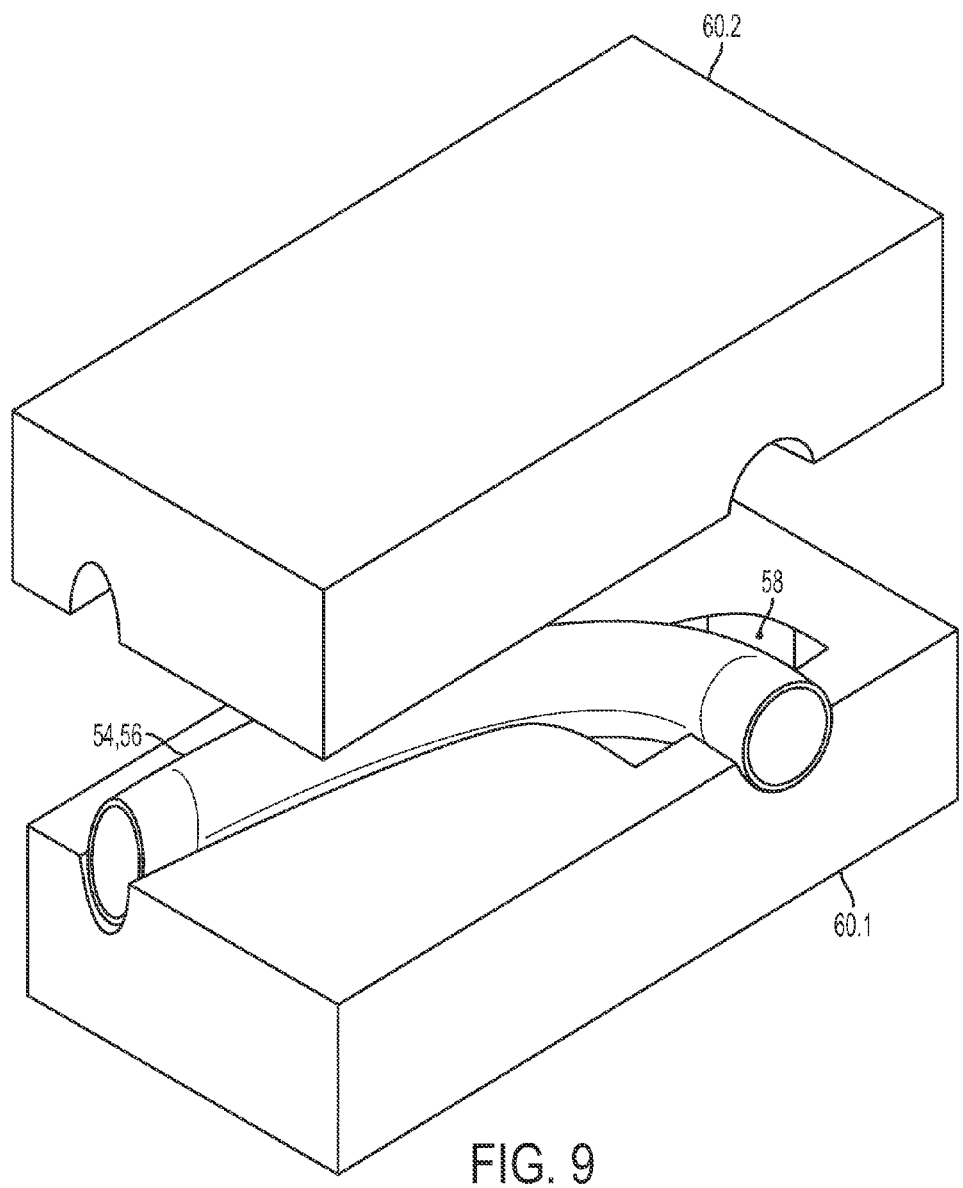
FIG. 9 illustrates the insertion of the pre-form from FIG. 8b within a die cavity of a pair of mating dies prior to an associated hydroforming operation.
Figure 10:
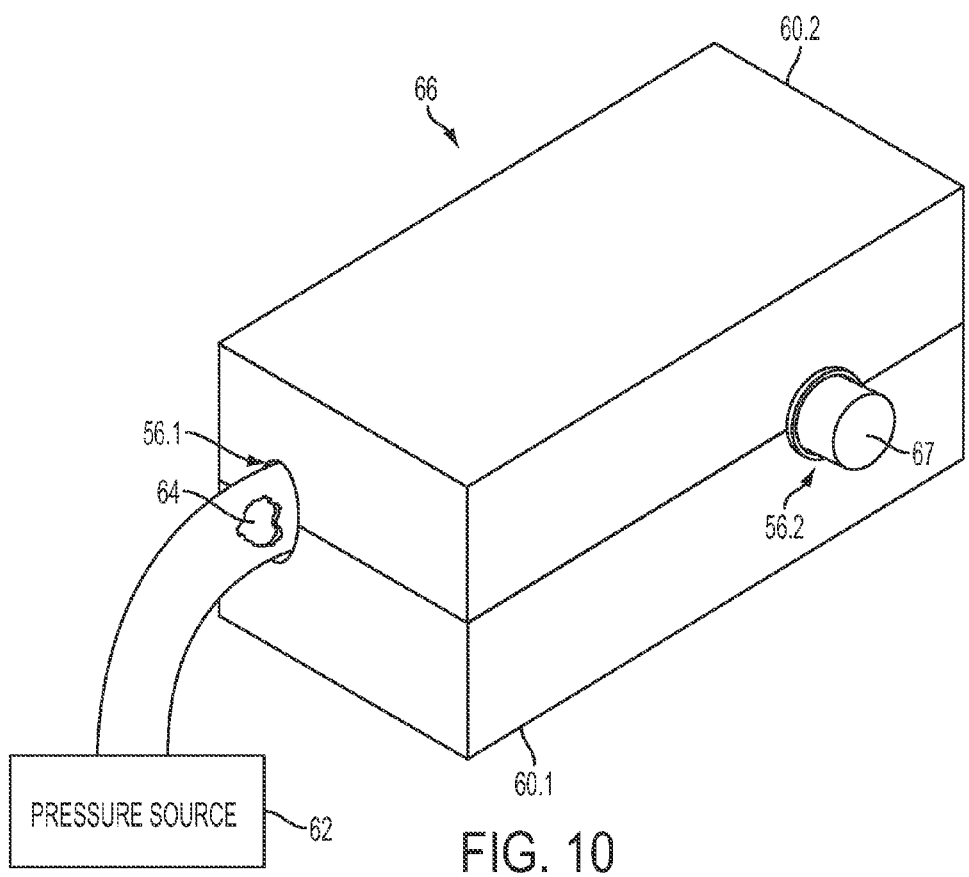
FIG. 10 illustrates the hydroforming of the pre-form illustrated in FIG. 8b within the mating dies illustrated in FIG. 9, with the mating dies closed.
Figure 11:
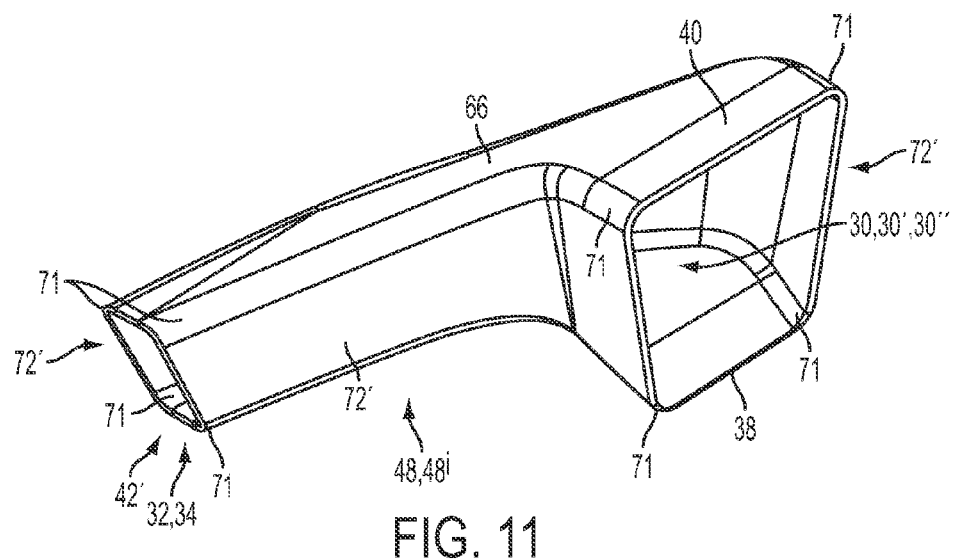
FIG. 11 illustrates a finished circumferential turbine nozzle segment after hydroforming and trimming.

Referring to FIGS. 8a, 8b and 9-11, in accordance with a first aspect of an associated manufacturing process, a first embodiment of a circumferential turbine nozzle segment 48, $48^i$ is hydro-formed from tubular material 54. In a first step, illustrated in FIG. 8a, the tubular material is first cut to length. Then, as illustrated in FIG. 8b, the pre-cut tubular material 54' is bent into a pre-form 56 that generally follows the trajectory of the associate annular-segment passage 30 of the circumferential turbine nozzle segment 48, 48.1. Referring to FIG. 9, the pre-form 56 is then inserted into a die cavity 58 distributed within and between a pair of mating dies 60.1, 60.2. Referring to FIG. 10, the mating dies 60.1, 60.2 are then closed around and over the pre-form 56, and the pre-form 56 is then sealed at each end 56.1, 56.2 and pressurized with fluid, either from a source 62 of high-pressure fluid 64, or by explosively pressurizing a fluid either in or added to the interior of the pre-form 56, thereby expanding the pre-form 56 to fill the die cavity 58 so a to form a corresponding hydro-formed segment 66. For example, FIG. 10 illustrates the source 62 of high-pressure fluid 64 sealed to the first end 56.1 of the pre-form 56, and the second end 56.2 thereof sealed with a plug 67.

Then, the high-pressure fluid 64 is withdrawn from the hydro-formed segment 66 and the hydro-formed segment 66 is removed from the die cavity 58 and trimmed to form the resulting circumferential turbine nozzle segment 48, 48.1, wherein the die cavity 58 within the mating dies 60.1, 60.2 is shaped so as to produce a final intended shape and size of the associated pre-formed annular-segment passage 30' and associated minimum through-flow area 42' accounting for the effects of elasticity of the underlying tubular material 54.

Referring to FIG. 12, in accordance with a second aspect of an associated manufacturing process, a second embodiment of a circumferential turbine nozzle segment 48, 48$^{ii}$ is constructed from a plurality of separate pieces welded or brazed together. For example, in one embodiment, the circumferential turbine nozzle segment 48, 48$^{ii}$ is constructed from first 68.1 and second 68.2 halves, each of which is separately formed from sheet metal that is stamped and trimmed, the pair of which are collocated prior to welding or brazing using a fixture to control the final shape and size of the associated pre-formed annular-segment passage 30' and associated minimum through-flow area 42' after the first 68.1 and second 68.2 halves are welded or brazed together.

Figure 13:
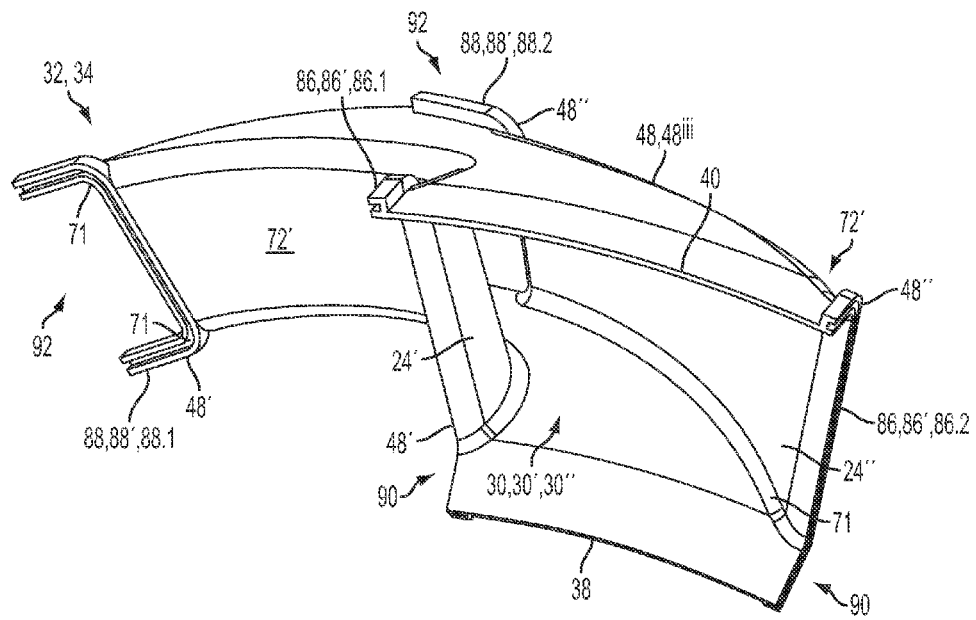
FIG. 13 illustrates a circumferential turbine nozzle segment constructed in accordance with a third aspect of an associated manufacturing process.

Referring to FIG. 13, in accordance with a third aspect of an associated manufacturing process, a third embodiment of a circumferential turbine nozzle segment 48, 48$^{iii}$ is formed using a casting or sintering process, for example, investment casting or laser sintering. The separate circumferential turbine nozzle segments 48, 48$^{iii}$ may then be joined to one another by either welding or brazing, or fastened to one another using associated fasteners.

The manufacture of circumferential turbine nozzle segment 48 provides for a smooth uniformly filleted interface 71 between each associated nozzle vane portion 24', 24" and the portions of the inner 38 and outer 40 endwalls therebetween which is beneficial to both the structural integrity of the turbine nozzle 10 and the flow characteristics of the associated annular-segment passages 30.

Figure 3:
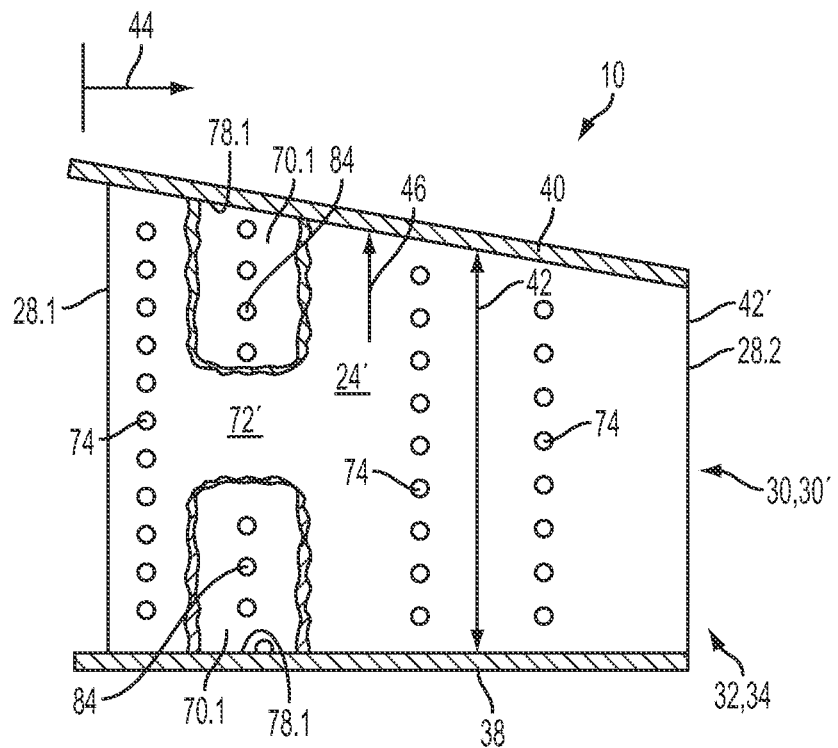
FIG. 3 illustrates a longitudinal cross-sectional view of an annular-segment passage of the turbine nozzle illustrated in FIGS. 2a and 2b, including a fragmentary view of an associated impingement liner.
Figure 2B:
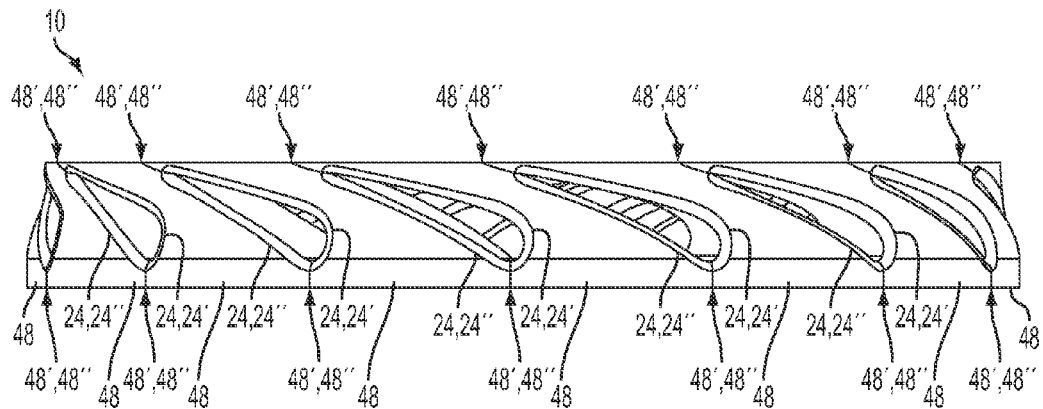
Figure 2A:
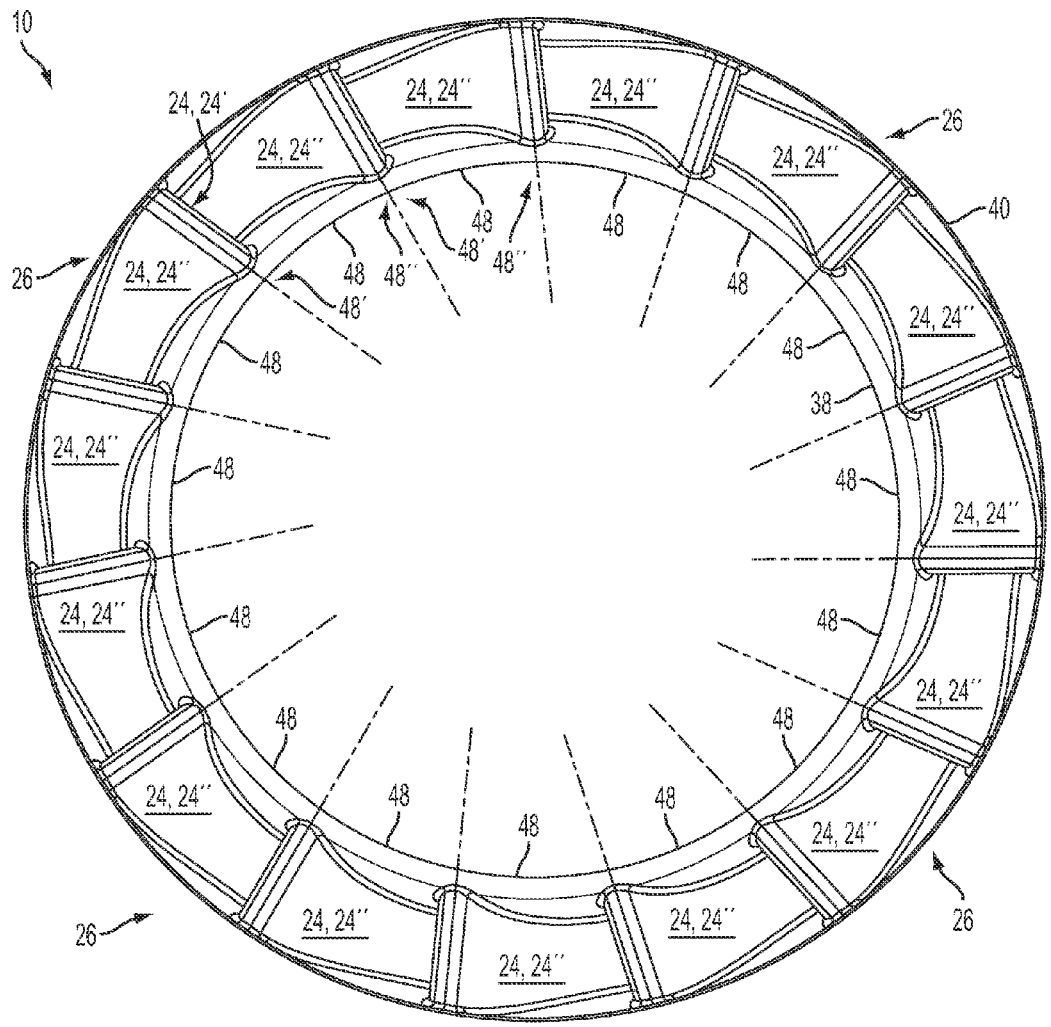
FIG. 2a illustrates a plan view of a turbine nozzle comprising a plurality of associated circumferential turbine nozzle segments.
Figure 4:
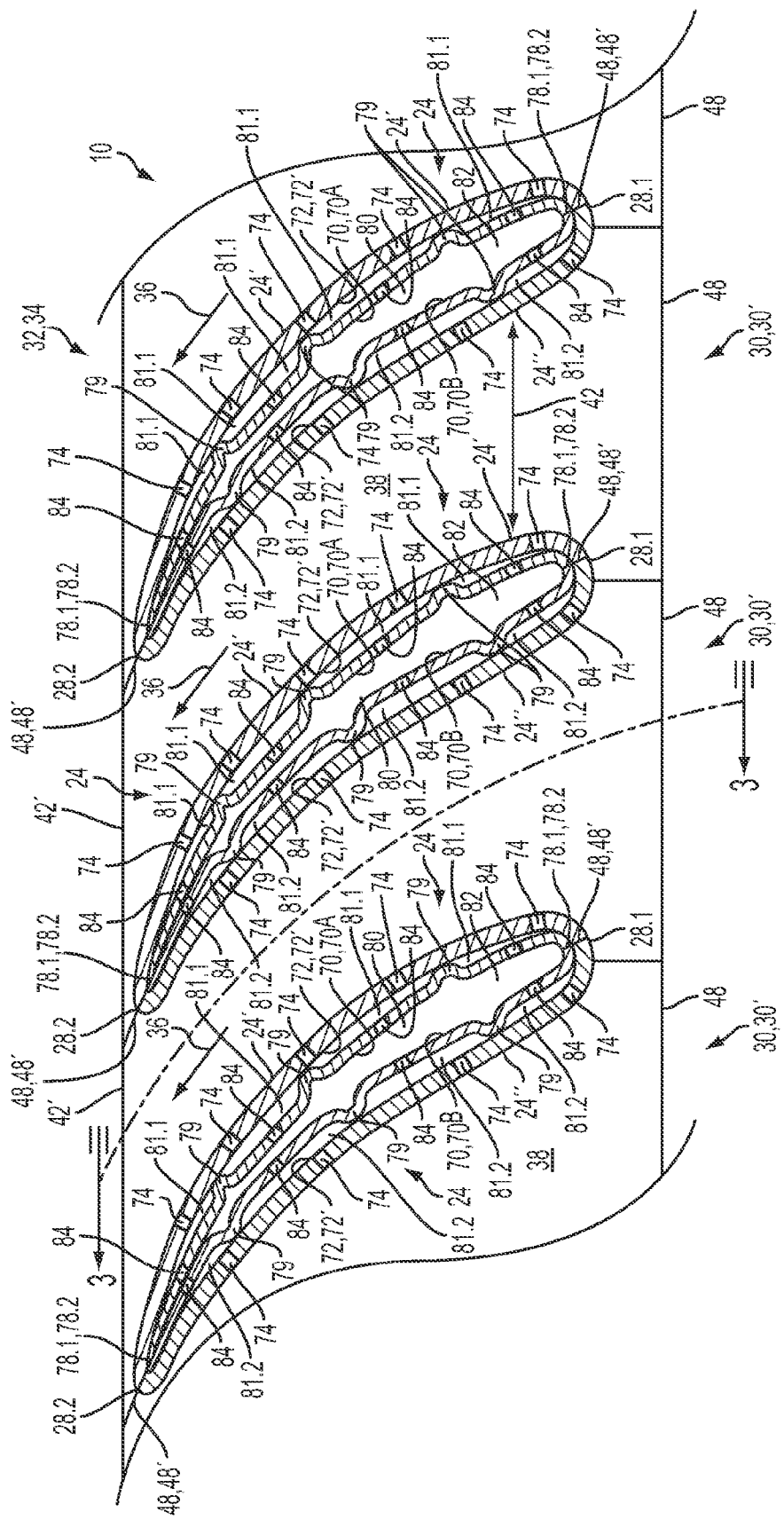
FIG. 4 illustrates a radial view of a circumferential cross section of the turbine nozzle illustrated in FIGS. 2a and 2b.

Furthermore, referring to FIGS. 3 and 4, in accordance with a first aspect of a process for incorporating impingement liners 70 in the nozzle vanes 24 of the turbine nozzle 10, internal impingement liners 70 may be readily incorporated onto the interior surfaces 72 of the nozzle vanes 24 prior to assembly of the circumferential turbine nozzle segment 48 to form the turbine nozzle 10, at which time the associated interior surfaces 72 of the associated first $24^1$ and second $24^2$ bounding nozzle vanes via the external sides 72' of first 24' and second 24" portions thereof relative to the circumferential turbine nozzle segment 48, so at to be accessible for welding, brazing or drilling. For example, cooling holes 74 may be drilled through the external sides 72' of the associated first $24^1$ and second $24^2$ bounding nozzle vanes, and corresponding first $70^A$ and second $70^B$ impingement liner portions may be added thereto and welded or brazed to the associated first $24^1$ and second $24^2$ bounding nozzle vanes along a substantial portion of corresponding closed paths around each of the first $70^A$ and second $70^B$ impingement liner portions, for example, along or within each associated periphery 78.1, 78.2 thereof, wherein the first $70^A$ and second $70^B$ impingement liner portions incorporate dimples, ridges or standoffs 79 that provide an offset from the associated interior surfaces 72 of the associated first 24' and second 24" portions of the corresponding adjacent first $24^1$ and second $24^2$ bounding nozzle vanes, thereby defining corresponding one or more first 81.1 and second 81.2 cavities. Accordingly, with first 24' and second 24" portions of adjacent first $24^1$ and second $24^2$ bounding nozzle vanes of different circumferential turbine nozzle segment 48 joined to one another in the turbine nozzle 10, the interior 80 of the resulting nozzle vane 24 formed therebetween can be pressurized with cooling air 82 during operation of the turbine nozzle 10 in a gas turbine engine 12 so as to provide for impingement cooling of the nozzle vane 24, wherein the pressurized cooling air 82 in the interior 80 of the nozzle vane 24 flows through impingement cooling holes 84 in each of the first $70^A$ and second $70^B$ impingement liner portions on different opposing interior surfaces 72 of the nozzle vane 24, thereby flowing into the associated one or more first 81.1 and second 81.2 cavities in fluid communication therewith and impinging upon and cooling the associated interior surfaces 72 of the nozzle vane 24, flowing within the associated one or more first 81.1 and second 81.2 cavities, and then exiting the nozzle vane 24 through the cooling holes 74 drilled through the surfaces thereof and in fluid communication with the one or more first 81.1 and second 81.2 cavities. The cooling holes 74 and the impingement cooling holes 84 may be drilled using any drilling process suitable for the underlying materials, for example either laser, electron beam or mechanical drilling or punching processes.

Referring again to FIG. 13, each circumferential turbine nozzle segment 48, 48$^{iii}$ may also incorporate inlet 86 and outlet 88 seals at respective inlet 90 and outlet 92 boundaries thereof, for example, feather seals 86', 88', wherein first inlet 86.1 and outlet 88.1 seals at a first azimuthal boundary 48' of one circumferential turbine nozzle segment 48, 48$^{iii}$ seal with second inlet 86.2 and outlet 88.2 seals at a second azimuthal boundary 48" of an abutting other circumferential turbine nozzle segment 48, 48$^{iii}$, so as to provide for sealing the abutting first 24' and second 24" portions of the abutting first $24^1$ and second $24^2$ bounding nozzle vanes of adjacent circumferential turbine nozzle segment 48, 48$^{iii}$ to one another without requiring welding or brazing, thereby providing for pressurizing the interior 80 of the resulting nozzle vane 24 formed therebetween so as to provide for impingement cooling during operation thereof. For example, associated underlying sealing surfaces of the inlet 86 and outlet 88 seals at the respective inlet 90 and outlet 92 boundaries of the circumferential turbine nozzle segment 48, 48$^{iii}$ may be integrally cast or sintered with the remainder of the circumferential turbine nozzle segment 48, 48$^{iii}$.

Figure 14:
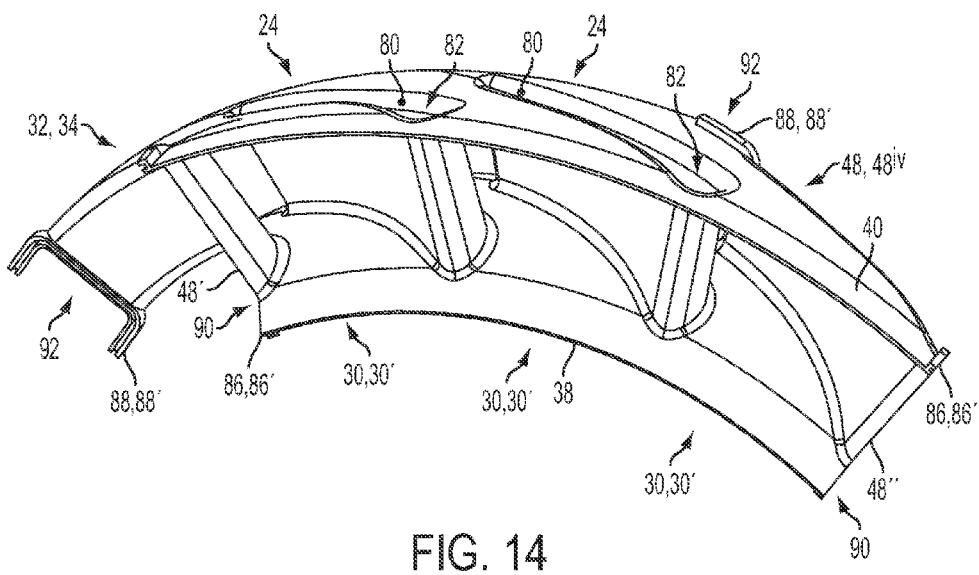
FIG. 14 illustrates a circumferential turbine nozzle segment constructed in accordance with a fourth aspect of an associated manufacturing process.

Referring to FIG. 14, in accordance with a fourth aspect of an associated manufacturing process, a fourth embodiment of a circumferential turbine nozzle segment 48, 48$^{iv}$ is formed using a casting or sintering process, for example, investment casting or laser sintering as in accordance with the third aspect described hereinabove, but with each circumferential turbine nozzle segment 48, 48$^{iv}$ containing a plurality of pre-formed annular-segment passages 30' with at least one nozzle vane 24 between the first 24' and second 24" portions of the first $24^1$ and second $24^2$ bounding nozzle vanes at the azimuthal boundaries 48', 48" of the circumferential turbine nozzle segment 48, 48$^{iv}$. Accordingly, the circumferential turbine nozzle segment 48, 48$^{iv}$ contains at least one complete nozzle vane 24, but with the first 48' and second 48" azimuthal boundaries located within the associated first $24^1$ and second $24^2$ bounding nozzle vanes so that all of the associated annular-segment passages 30 are pre-formed 30' so that the associated minimum through-flow areas 42' thereof associated with the throat 32 of the turbine nozzle 10 are substantially unaffected by variability associated with the assembly of adjacent circumferential turbine nozzle segments 48, 48$^{iv}$ to one another. The separate circumferential turbine nozzle segments 48, 48$^{iv}$ may then be joined to one another by either welding or brazing, or fastened to one another using associated fasteners, and may further incorporate inlet 86 and outlet 88 seals as possible in accordance with the third aspect described hereinabove.

Figure 15:
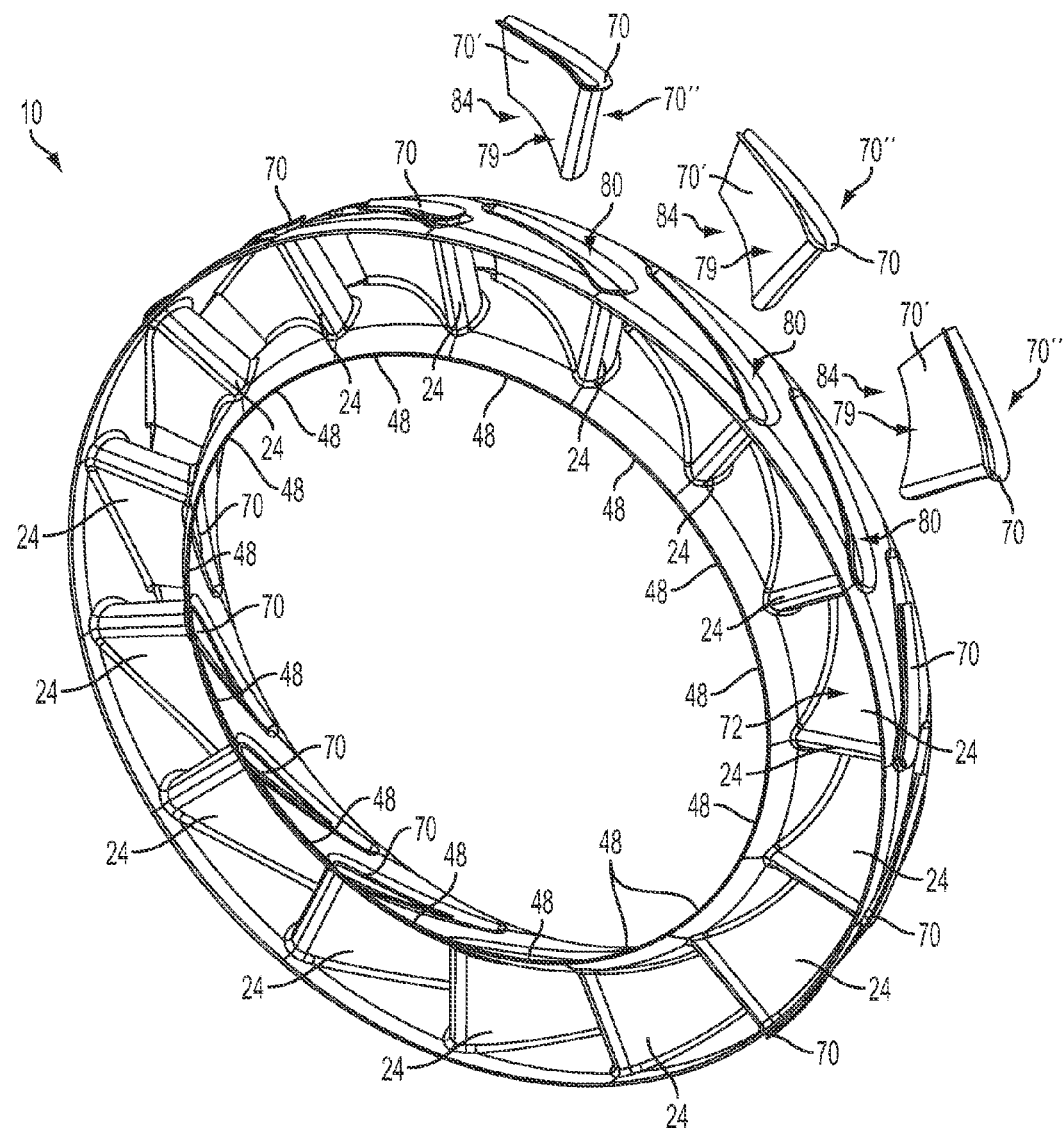
FIG. 15 illustrates a second aspect of a manufacturing process for incorporating impingement liners in the nozzle vanes of a turbine nozzle constructed from a plurality of associated circumferential turbine nozzle segments.

Referring to FIG. 15, in accordance with a second aspect of a manufacturing process for incorporating one or more impingement liners 70 in the nozzle vanes 24 of the turbine nozzle 10, the turbine nozzle 10 is first assembled from circumferential turbine nozzle segments 48, 48$^i$, 48$^{ii}$, 48$^{iii}$, 48$^{iv}$, and then one or more impingement liners 70 are inserted in the corresponding one or more interiors 80 of the resulting corresponding nozzle vanes 24 of the turbine nozzle 10. For example, in one embodiment, a separate impingement liner 70 is inserted in each interior 80 of each resulting corresponding nozzle vane 24 of the turbine nozzle 10, wherein each impingement liner 70 incorporates a plurality of impingement cooling holes 84 through the surface thereof that cooperate with associated cooling holes 74 through the surfaces of the nozzle vanes 24 so as to provide for cooling air 82 admitted to the interior 80 of the nozzle vanes 24 and associated impingement liners 70 to flow through the impingement cooling holes 84 through the surfaces of the impingement liners 70 and impinge upon the associated interior surfaces 72 of the nozzle vanes 24 and then discharge through the cooling holes 74 through the surfaces of the nozzle vanes 24 into the associated annular-segment passages 30, thereby cooling the nozzle vanes 24. For example, the surfaces of the impingement liners 70 are shaped or formed so as to incorporate dimples, ridges or standoffs 79 that provide for forming a plurality of cavities 81 between the exterior surfaces 70', 70" of the impingement liners 70 and the interior surfaces 72 of the nozzle vanes 24, in fluid communication with both the impingement cooling holes 84 and the cooling holes 74 through the surfaces of the nozzle vanes 24, so as to provide for offsetting the impingement cooling holes 84 from the interior surfaces 72 of the nozzle vanes 24, which provides for associated impingement cooling of the interior surfaces 72 of the nozzle vanes 24 by impingement of associated cooling air 82 from the impingement cooling holes 84 flowing across the associated cavity 81 thereupon.

Figure 16:
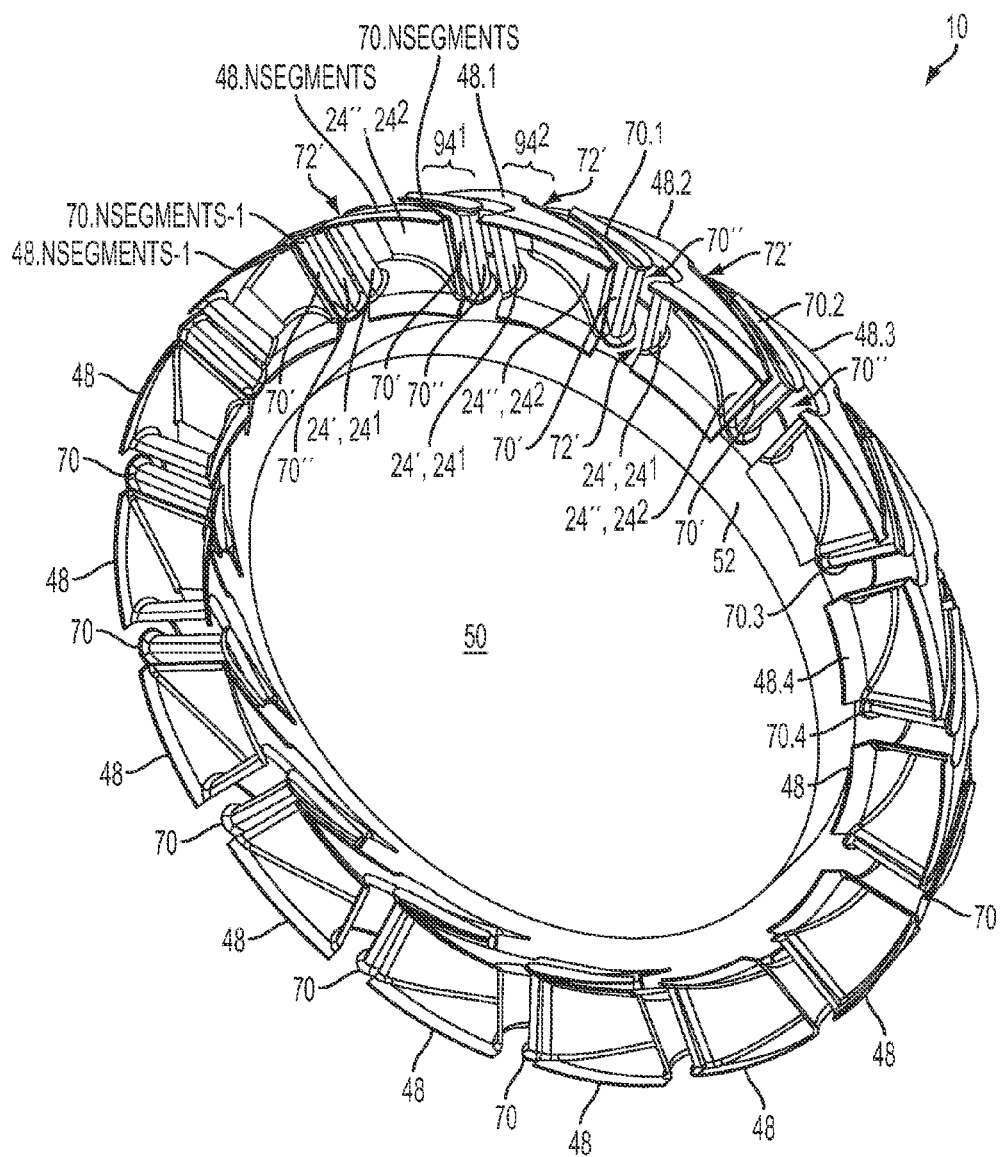
FIG. 16 illustrates a third aspect of a manufacturing process for incorporating impingement liners in the nozzle vanes of a turbine nozzle constructed from a plurality of associated circumferential turbine nozzle segments.

Referring to FIG. 16, in accordance with a third aspect of a manufacturing process for incorporating one or more impingement liners 70 in the nozzle vanes 24 of a turbine nozzle 10 constructed from a plurality of associated circumferential turbine nozzle segments 48, 48$^i$, 48$^{ii}$, 48$^{iii}$, 48$^{iv}$; the associated one or more impingement liners 70 are inserted into the corresponding interiors 80 of the corresponding nozzle vanes 24 concurrently with formation of the nozzle vanes 24 from the assembly of the turbine nozzle 10 from the associated circumferential turbine nozzle segments 48, 48$^i$, 48$^{ii}$, 48$^{iii}$, 48$^{iv}$, wherein the circumferential turbine nozzle segments 48, 48$^i$, 48$^{ii}$, 48$^{iii}$, 48$^{iv}$ are effectively assembled around the associated impingement liners 70.

For example, in accordance with a first embodiment of the third aspect of the manufacturing process for incorporating one or more impingement liners 70 in the nozzle vanes 24 of a turbine nozzle 10 constructed from a plurality of associated circumferential turbine nozzle segments 48, 48$^i$, 48$^{ii}$, a first circumferential turbine nozzle segment 48.1 is first located on the outer surface 52 of a central cylindrical mandrel 50, followed by a first impingement liner 70.1, wherein a first exterior surface 70' of the first impingement liner 70.1 is located against the exterior side 72' of the second portion 24" of the second bounding nozzle vane 24$^2$ of the first circumferential turbine nozzle segment 48.1. A second circumferential turbine nozzle segment 48.2 is then located on the outer surface 52 of a central cylindrical mandrel 50 with the exterior side 72' of the first portion 24' of the first bounding nozzle vane 24$^1$ of the second circumferential turbine nozzle segment 48.2 against a second exterior surface 70" of the first impingement liner 70.1. This process continues with the third circumferential turbine nozzle segment 48.3, the second impingement liner 70.2, the fourth circumferential turbine nozzle segment 48.4, and so on, until the last circumferential turbine nozzle segment 48.N$_{segments}$ is then located on the outer surface 52 of a central cylindrical mandrel 50 with the exterior side 72' of the first portion 24' of the first bounding nozzle vane 24$^1$ of the last circumferential turbine nozzle segment 48.N$_{segments}$ against a second exterior surface 70" of the next-to-last impingement liner 70.($N_{segments}-1$), leaving a gap 94$^1$ between the first 48.1 and last 48.N$_{segments}$ circumferential turbine nozzle segments into which is inserted the last impingement liner 70.N$_{segments}$. The circumferential turbine nozzle segments 48 and associated impingement liners 70 may be welded or brazed to one another either one by one during the above assembly process as each circumferential turbine nozzle segment 48 and impingement liner 70 is placed against another, or after all or some of the circumferential turbine nozzle segments 48 and associated impingement liners 70 have been located on the outer surface 52 of the central cylindrical mandrel 50, so as to form the resulting turbine nozzle 10.

Alternatively, in accordance with a second embodiment of the third aspect of the manufacturing process for incorporating one or more impingement liners 70 in the nozzle vanes 24 of a turbine nozzle 10 constructed from a plurality of associated circumferential turbine nozzle segments 48, 48$^i$, 48$^{ii}$, the first impingement liner 70.1 is first located on the outer surface 52 of a central cylindrical mandrel 50, followed by the second circumferential turbine nozzle segment 48.2, wherein the second exterior surface 70" of the first impingement liner 70.1 is located against the exterior side 72' of the first portion 24' of the first bounding nozzle vane 24$^1$ of the second circumferential turbine nozzle segment 48.2. The second impingement liner 70.2 is then located on the outer surface 52 of a central cylindrical mandrel 50 with the first exterior surface 70' of the second impingement liner 70.2 located against the exterior side 72' of the second portion 24" of the second bounding nozzle vane 24$^2$ of the second circumferential turbine nozzle segment 48.2. The third circumferential turbine nozzle segment 48.3 is then located on the outer surface 52 of a central cylindrical mandrel 50 with the exterior side 72' of the first portion 24' of the first bounding nozzle vane 24$^1$ of the third circumferential turbine nozzle segment 48.3 against a second exterior surface 70" of the second impingement liner 70.2. This process continues with the third impingement liner 70.3, the fourth circumferential turbine nozzle segment 48.4, the fourth impingement liner 70.4, and so on, until the first exterior surface 70' of the last impingement liner 70.N$_{segments}$ is located against the exterior side 72' of the second portion 24" of the N$_{segments}^{th}$ circumferential turbine nozzle segment 48.N$_{segments}$, leaving a gap 94$^2$ between the first 70.1 and last 70.N$_{segments}$ impingement liners into which is inserted the first circumferential turbine nozzle segment 48.1. As with the first embodiment, the circumferential turbine nozzle segments 48 and associated impingement liners 70 may be welded or brazed to one another either during the above assembly process as each circumferential turbine nozzle segment 48 and impingement liner 70 is placed against another, or after all the circumferential turbine nozzle segments 48 and associated impingement liners 70 have been located on the outer surface 52 of the central cylindrical mandrel 50.

Figure 17:
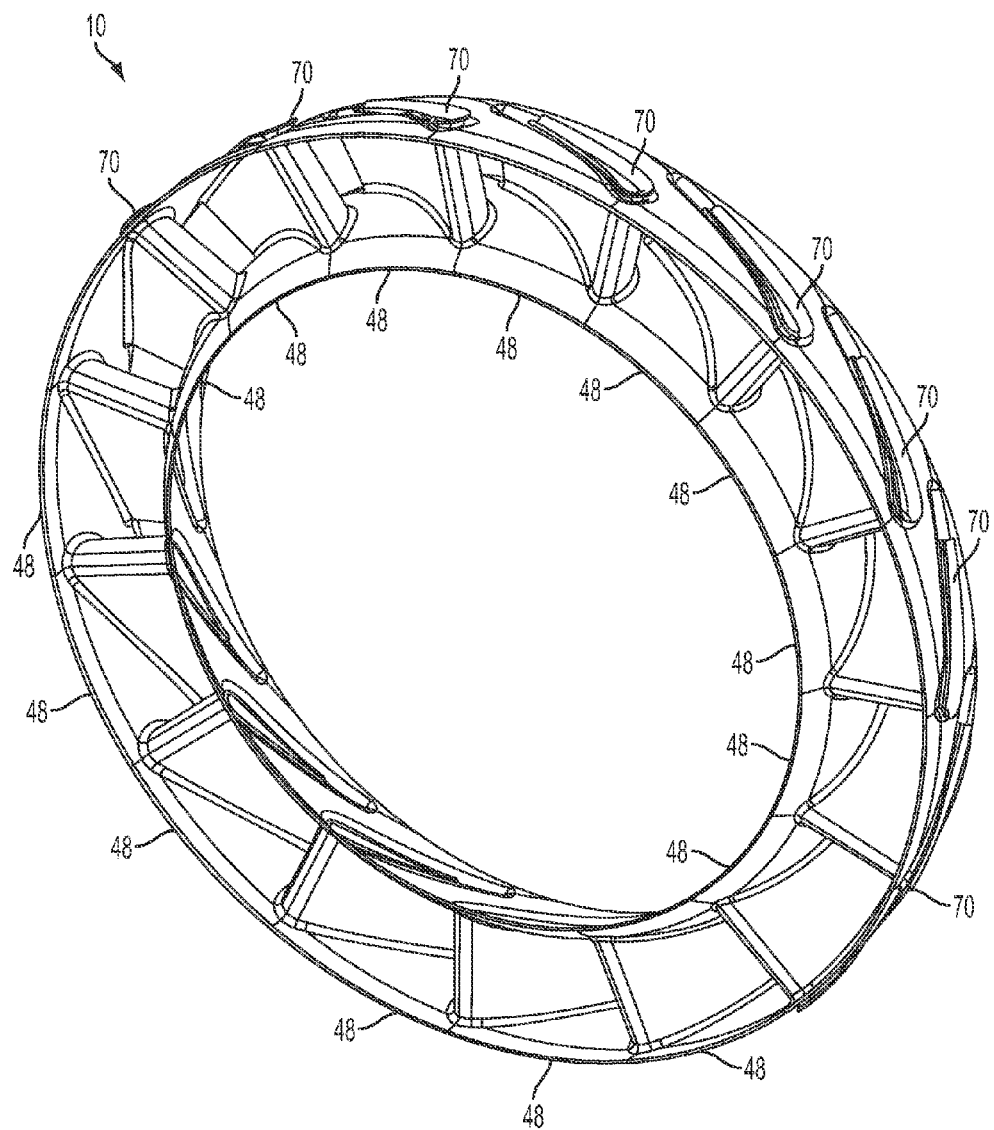
FIG. 17 illustrates a turbine nozzle resulting from either of the manufacturing processes illustrated in FIG. 15 or 16 for incorporating associated impingement liners in the nozzle vanes thereof.
Figure 18:
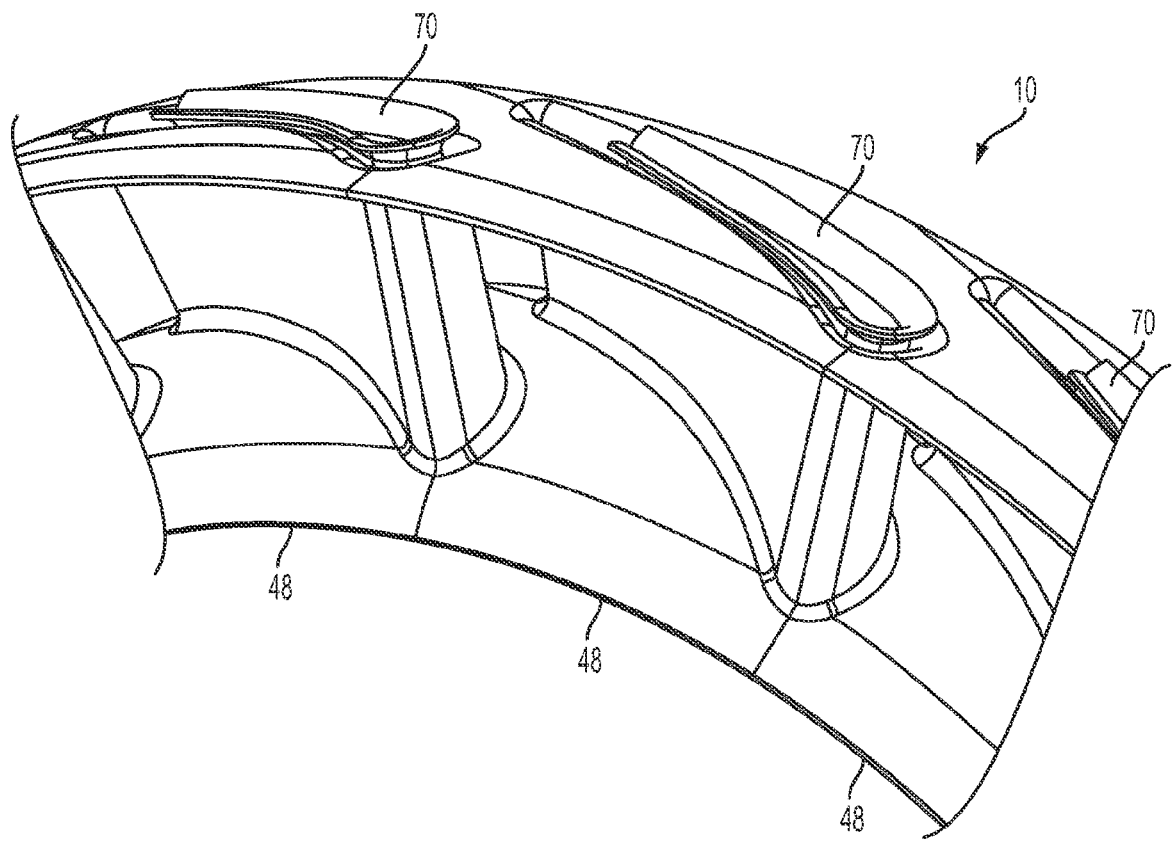
FIG. 18 illustrates a fragmentary view of a portion of the turbine nozzle illustrated in FIG. 17.

FIG. 17 illustrates the turbine nozzle 10 resulting from either of the manufacturing processes in accordance with the second or third aspects respectfully illustrated in FIGS. 15 and 16, respectively, and FIG. 18 illustrates a fragmentary view of a portion of the turbine nozzle illustrated in FIG. 17. As for the second aspect of the manufacturing process for incorporating one or more impingement liners 70 in the nozzle vanes 24 of a turbine nozzle 10 constructed from a plurality of associated circumferential turbine nozzle segments 48, 48$^i$, 48$^{ii}$, each impingement liner 70 incorporates a plurality of impingement cooling holes 84 through the surface thereof that cooperate with associated cooling holes 74 through the surfaces of the nozzle vanes 24 so as to provide for cooling air 82 admitted to the interior 80 of the nozzle vanes 24 and associated impingement liners 70 to flow through the impingement cooling holes 84 through the surfaces of the impingement liners 70 and impinge upon the associated interior surfaces 72 of the nozzle vanes 24 and then discharge through the cooling holes 74 through the surfaces of the nozzle vanes 24 into the associated annular-segment passages 30, thereby cooling the nozzle vanes 24. For example, the surfaces of the impingement liners 70 are shaped or formed so as to incorporate dimples, ridges or standoffs 79 that provide for forming a plurality of cavities 81 between the exterior surfaces 70', 70" of the impingement liners 70 and the interior surfaces 72 of the nozzle vanes 24, in fluid communication with both the impingement cooling holes 84 and the cooling holes 74 through the surfaces of the nozzle vanes 24, so as to provide for offsetting the impingement cooling holes 84 from the interior surfaces 72 of the nozzle vanes 24, which provides for associated impingement cooling of the interior surfaces 72 of the nozzle vanes 24 by impingement of associated cooling air 82 from the impingement cooling holes 84 flowing across the associated cavity 81 thereupon.

Accordingly, the circumferential turbine nozzle segments 48, 48$^i$, 48$^{ii}$, 48$^{iii}$, 48$^{iv}$ provide for accurately and consistently forming the associated throat 32 of the turbine nozzle 10, thereby providing for consistent performance during use, even for high pressure turbine nozzles 10 constructed of sheet metal as might be used in relatively short-life gas turbine engines 12. Furthermore, although the turbine nozzle 10 has been illustrated hereinabove in the environment of a gas turbine engine 12, the application of the turbine nozzle 10 is not so limited, but instead could be applied to any turbine application using a turbine nozzle to direct high pressure fluid at turbine blades 18 so as to cause a rotation of an associated turbine rotor 20, for example, including liquid or gaseous fluid-driven turbines, for example, water or steam driven turbines.

The circumferential turbine nozzle segments 48, 48$^i$, 48$^{ii}$, 48$^{iii}$, 48$^{iv}$ are constructed of a material suitable for the application. For example, a turbine nozzle 10 used in a gas turbine engine 12 to direct high temperature exhaust gases 14 would be constructed of a material that can withstand high temperature exhaust gases 14, for example, of a nickel alloy, for example, stainless steel with a relatively high nickel content, for example, 310 stainless steel, that provides for high temperature oxidation resistance and strength.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A turbine nozzle segment, wherein a plurality of said turbine nozzle segments provide for forming an associated turbine nozzle when circumferentially disposed in cooperative relationship with one another about a central axis, said turbine nozzle segment comprising:

a. an inner endwall portion;
   b. an outer endwall portion, wherein said inner and outer endwall portions are each generally curved about said central axis, and said outer endwall portion is generally outside said inner endwall portion relative to said central axis;
   c. a first portion of a first bounding nozzle vane, wherein said first portion of said first bounding nozzle vane extends between said inner and outer endwall portions at a first azimuthal boundary of said turbine nozzle segment;
   d. a second portion of a second bounding nozzle vane, wherein said second portion of said second bounding nozzle vane extends between said inner and outer endwall portions at a second azimuthal boundary of said turbine nozzle segment, and said first and second azimuthal boundaries are azimuthally displaced from one another relative to said central axis;
   e. at least one annular-segment passage, wherein said at least one annular-segment passage is bounded by said inner and outer endwall portions, one said at least one annular-segment passage is bounded by said first portion of said first bounding nozzle vane and one said at least one annular-segment passage is bounded by said second portion of said second bounding nozzle vane, a first external boundary of said first portion of said first bounding nozzle vane is shaped so as to provide for mating with a second external boundary of said second portion of said second bounding nozzle vane when said first portion of said first bounding nozzle vane is part of said turbine nozzle segment and said second portion of said second bounding nozzle vane is part of a first other turbine nozzle segment, or when said second portion of said second bounding nozzle vane is part of said turbine nozzle segment and said first portion of said first bounding nozzle vane is part of a second other turbine nozzle segment, and said first portion of said first bounding nozzle vane, said second portion of said second bounding nozzle vane and said first and second external boundaries are shaped so that said second portion of said second bounding nozzle vane of said first other turbine nozzle segment and said first portion of said first bounding nozzle vane of said turbine nozzle segment when azimuthally abutted against one another constitute said first bounding nozzle vane, and said first portion of said first bounding nozzle vane of said second other turbine nozzle segment and said second portion of said second bounding nozzle vane of said turbine nozzle segment when azimuthally abutted against one another constitute said second bounding nozzle vane, wherein each said first and second other turbine nozzle segment is shaped substantially the same as said turbine nozzle segment.

2. A turbine nozzle segment as recited in claim 1, wherein said first portion of said first bounding nozzle vane is continuous with at least respective first portions of both said inner and outer endwall portions, respectively, and said second portion of said second bounding nozzle vane is continuous with at least respective second portions of both said inner and outer endwall portions, respectively.

3. A turbine nozzle segment as recited in claim 2, further comprising:
   a. a first fillet between said first portion of said first bounding nozzle vane and said first portion of said inner endwall portion;
   b. a second fillet between said first portion of said first bounding nozzle vane and said first portion of said outer endwall portion;
   c. a third fillet between said second portion of said second bounding nozzle vane and said second portion of said inner endwall portion; and
   d. a fourth fillet between said second portion of said second bounding nozzle vane and said second portion of said outer endwall portion.

4. A turbine nozzle segment as recited in claim 2, wherein said first and second portions of said inner endwall portion are continuous with one another, and said first and second portions of said outer endwall portion are continuous with one another.

5. A turbine nozzle segment as recited in claim 2, wherein said first and second portions of said inner endwall portion are distinct from one another and joined to one another at a boundary therebetween, and said first and second portions of said outer endwall portion are distinct from one another and joined to one another at a boundary therebetween.

6. A turbine nozzle segment as recited in claim 5, wherein said first and second portions of said inner endwall portion are joined to one another at said boundary therebetween by welding or brazing, and said first and second portions of said outer endwall portion are joined to one another at said boundary therebetween by welding or brazing.

7. A turbine nozzle segment as recited in claim 1, wherein said first portion of said first bounding nozzle vane comprises a suction side of said first bounding nozzle vane, and said second portion of said second bounding nozzle vane comprises a pressure side of said second bounding nozzle vane.

8. A turbine nozzle segment as recited in claim 1, wherein said first portion of said first bounding nozzle vane extends from a leading edge to a trailing edge of said first bounding nozzle vane, and said second portion of said second bounding nozzle vane extends from a leading edge to a trailing edge of said second bounding nozzle vane.

9. A turbine nozzle segment as recited in claim 8, wherein said leading edge of said first portion of said first bounding nozzle vane comprises a first sealing surface, said leading edge of said second portion of said second bounding nozzle vane comprises a second sealing surface, said trailing edge of said first portion of said first bounding nozzle vane comprises a third sealing surface, said trailing edge of said second portion of said second bounding nozzle vane comprises a fourth sealing surface, and said first and second sealing surfaces are adapted to cooperate with one another so as to provide for sealing a first junction therebetween for different said turbine nozzle segments, and said third and fourth sealing surfaces are adapted to cooperate with one another so as to provide for sealing a second junction therebetween for different said turbine nozzle segments, so as to provide for sealing an interior of a corresponding first or second bounding vane defined thereby.

10. A turbine nozzle segment as recited in claim 9, further comprising a first feather seal that provides for the cooperation between said first and second sealing surfaces; and a second feather seal that provides for the cooperation between said third and fourth sealing surfaces.

11. A turbine nozzle segment as recited in claim 1, wherein said at least one annular-segment passage comprises a single annular-segment passage bounded in part by said first portion of said first bounding nozzle vane and by said second portion of said second bounding nozzle vane.

12. A turbine nozzle segment as recited in claim 1, wherein said at least one annular-segment passage comprises a plurality of annular-segment passages and at least one complete nozzle vane azimuthally therebetween.

13. A turbine nozzle segment as recited in claim 1, wherein said at least one annular-segment passage comprises an inlet and an outlet, and an effective through-flow area of said at least one annular-segment passage at said outlet does not exceed a corresponding effective through-flow area elsewhere within said at least one annular-segment passage.

14. A turbine nozzle segment as recited in claim 1, further comprising at least one of:
   a. a first impingement liner portion operatively coupled to an exterior portion of said first portion of said first bounding nozzle vane relative to said turbine nozzle segment, wherein said first impingement liner portion incorporates a plurality of impingement cooling holes in fluid communication with at least one first cavity between said first impingement liner portion and said first portion of said first bounding nozzle vane, and said first portion of said first bounding nozzle vane incorporates a plurality of cooling holes that provide for fluid communication between said at least one first cavity and said at least one annular-segment passage, or
   b. a second impingement liner portion operatively coupled to an exterior portion of said second portion of said second bounding nozzle vane relative to said turbine nozzle segment, wherein said second impingement liner portion incorporates a plurality of impingement cooling holes in fluid communication with at least one second cavity between said second impingement liner portion and said second portion of said second bounding nozzle vane, and said second portion of said second bounding nozzle vane incorporates a plurality of cooling holes that provide for fluid communication between said at least one second cavity and said at least one annular-segment passage.

15. A turbine nozzle segment as recited in claim 14, wherein the operative coupling of said first impingement liner portion if present to said first portion of said first bounding nozzle vane comprises welding or sealing said first impingement liner portion along a substantial portion of a first periphery thereof and the operative coupling of said second impingement liner portion if present to said second portion of said second bounding nozzle vane comprises welding or sealing said second impingement liner portion along a substantial portion of a second periphery thereof.

16. A turbine nozzle segment as recited in claim 1, wherein said turbine nozzle segment is manufactured by either hydroforming or explosively forming a tubular material within a plurality of dies.

17. A turbine nozzle segment as recited in claim 1, wherein said turbine nozzle segment is manufactured by either casting or sintering.

18. A turbine nozzle segment as recited in claim 5, wherein said turbine nozzle segment is manufactured by stamping said first portion of said first bounding nozzle vane together with said first portions of said inner and outer endwall portions, and separately stamping said second portion of said second bounding nozzle vane together with said second portions of said inner and outer endwall portions.

19. A turbine nozzle segment as recited in claim 1, wherein said turbine nozzle segment is replicated so as to provide for said plurality of said turbine nozzle segments, said plurality of said turbine nozzle segments are assembled azimuthally abutting one another about said central axis so as to form said turbine nozzle, and for each said turbine nozzle segment in said turbine nozzle, said first portion of said first bounding nozzle vane of said turbine nozzle segment abuts said second portion of said second bounding nozzle vane of said first other turbine nozzle segment, and said second portion of said second bounding nozzle vane of said turbine nozzle segment abuts said first portion of said first bounding nozzle vane of said second other turbine nozzle segment.

20. A turbine nozzle segment as recited in claim 19, wherein at least one said turbine nozzle segment is welded or brazed to said first other turbine nozzle segment at a first joint where said first portion of said first bounding nozzle vane of said turbine nozzle segment abuts said second portion of said second bounding nozzle vane of said first other turbine nozzle segment, or at least one said turbine nozzle segment is welded or brazed to said second other turbine nozzle segment at a second joint where said second portion of said second bounding nozzle vane of said turbine nozzle segment abuts said first portion of said first bounding nozzle vane of said second other turbine nozzle segment.

21. A turbine nozzle segment as recited in claim 19, further comprising at least one impingement liner inserted within an interior of a corresponding at least one said first or second bounding nozzle vane.

22. A turbine nozzle segment as recited in claim 21, wherein said at least one impingement liner is substantially sealed along a radially-outer periphery to at least one of:
   a. a corresponding said outer endwall portion of at least one of said turbine nozzle segment or one of said first or second other turbine nozzle segment, or
   b. a radially-outer portion of an interior surface of said first or second bounding nozzle vane, and
   said at least one impingement liner is substantially sealed along a radially-inner periphery to at least one of:
   c. a corresponding said inner endwall portion of at least one of said turbine nozzle segment or one of said first or second other turbine nozzle segment, or
   d. a radially-inner portion of an interior surface of said first or second bounding nozzle vane.

23. A turbine nozzle segment as recited in claim 22, wherein said at least one impingement liner is substantially sealed with either a welded or brazed joint.

24. A method of manufacturing a turbine nozzle, comprising: assembling a plurality of turbine nozzle segments to one another so as to form a turbine nozzle incorporating a plurality of nozzle vanes, wherein each turbine nozzle segment of said plurality of turbine nozzle segments comprises:
   a. inner and outer circumferential endwall portions;
   b. a first portion of a first bounding nozzle vane bounded at a first azimuthal boundary extending through and bisecting said first bounding nozzle vane; and
   c. a second portion of a second bounding nozzle vane bounded at a second azimuthal boundary extending through and bisecting said second bounding nozzle vane; and
   the operation of assembling said plurality of turbine nozzle segments to one another comprises operatively coupling said first portion of said first bounding nozzle vane of a first turbine nozzle segment of said plurality of turbine nozzle segments to said second portion of said second bounding nozzle vane of a second turbine nozzle segment of said plurality of turbine nozzle segments so as to form a corresponding nozzle vane of said plurality of nozzle vanes, for at least one first turbine nozzle segment and at least one second turbine nozzle segment of said plurality of turbine nozzle segments of said turbine nozzle.

25. A method of manufacturing a turbine nozzle as recited in claim 24, further comprising forming at least one turbine nozzle segment of said plurality of turbine nozzle segments.

26. A method of manufacturing a turbine nozzle as recited in claim 25, wherein in the operation of forming said at least one turbine nozzle segment of said plurality of turbine nozzle segments, said at least one said turbine nozzle segment of said plurality of turbine nozzle segments is formed by either hydroforming or explosively forming a tubular material within a plurality of dies.

27. A method of manufacturing a turbine nozzle as recited in claim 25, wherein in the operation of forming said at least one turbine nozzle segment of said plurality of turbine nozzle segments, said at least one said turbine nozzle segment of said plurality of turbine nozzle segments is formed by either casting or sintering.

28. A method of manufacturing a turbine nozzle as recited in claim 25, wherein in the operation of forming said at least one turbine nozzle segment of said plurality of turbine nozzle segments, said at least one said turbine nozzle segment of said plurality of turbine nozzle segments is formed by stamping said first portion of said first bounding nozzle vane together with first portions of said inner and outer circumferential endwall portions, and separately stamping said second portion of said second bounding nozzle vane together with second portions of said inner and outer circumferential endwall portions.

29. A method of manufacturing a turbine nozzle as recited in claim 24, further comprising drilling a plurality of cooling holes through at least one of a portion of said first bounding nozzle vane of at least one said turbine nozzle segment, and a portion of said second bounding nozzle vane of at least one said turbine nozzle segment, wherein the operation of drilling said plurality of cooling holes is performed prior to the operation of assembling said plurality of turbine nozzle segments to one another so as to form said turbine nozzle and said plurality of nozzle vanes.

30. A method of manufacturing a turbine nozzle as recited in claim 24, further comprising at least one of:
   a. operatively coupling a first impingement liner portion to a first internal surface of said first bounding nozzle vane of at least one said turbine nozzle segment, wherein said first impingement liner portion incorporates a first plurality of impingement cooling holes therethrough, said first plurality of impingement cooling holes are offset from said first internal surface of said first bounding nozzle vane, said first internal surface of said first bounding nozzle vane is external of said turbine nozzle segment prior to assembly thereof into said turbine nozzle, and the operation of operatively coupling said first impingement liner portion to said first internal surface of said first bounding nozzle vane of said at least one said turbine nozzle segment is performed prior to the operation of assembling said plurality of turbine nozzle segments to one another so as to form said turbine nozzle and said plurality of nozzle vanes;
   b. operatively coupling a second impingement liner portion to a second internal surface of said second bounding nozzle vane of at least one said turbine nozzle segment, wherein said second impingement liner portion incorporates a second plurality of impingement cooling holes therethrough, said second plurality of impingement cooling holes are offset from said second internal surface of said second bounding nozzle vane, said second internal surface of said second bounding nozzle vane is external of said turbine nozzle segment prior to assembly thereof into said turbine nozzle, and the operation of operatively coupling said second impingement liner portion to said second internal surface of said second bounding nozzle vane of said at least one said turbine nozzle segment is performed prior to the operation of assembling said plurality of turbine nozzle segments to one another so as to form said turbine nozzle and said plurality of nozzle vanes.

31. A method of manufacturing a turbine nozzle as recited in claim 30, wherein the operation of operatively coupling said first impingement liner portion to said first internal surface of said first bounding nozzle vane of said at least one said turbine nozzle segment comprises sealing said first impingement liner portion to said first internal surface along a substantial portion of a first closed path along said first impingement liner portion either on or within a periphery thereof, and the operation of operatively coupling said second impingement liner portion to said second internal surface of said second bounding nozzle vane of said at least one said turbine nozzle segment comprises sealing said second impingement liner portion to said second internal surface along a substantial portion of a second closed path along said second impingement liner portion either on or within a periphery thereof.

32. A method of manufacturing a turbine nozzle as recited in claim 31, wherein at least one of the operations of sealing said first or second impingement liner portions respectively to said first or second internal surfaces comprise either welding or brazing.

33. A method of manufacturing a turbine nozzle as recited in claim 24, wherein the operation of assembling said plurality of turbine nozzle segments comprises: for each said turbine nozzle segment of said plurality of turbine nozzle segments incorporated in said turbine nozzle, azimuthally abutting said first azimuthal boundary of said first bounding nozzle vane of said turbine nozzle segment to said second azimuthal boundary of said second bounding nozzle vane of a first other said turbine nozzle segment of said plurality of turbine nozzle segments so as to form one of said plurality of nozzle vanes of said turbine nozzle, and azimuthally abutting said second azimuthal boundary of said second bounding nozzle vane of said turbine nozzle segment to said first azimuthal boundary of said first bounding nozzle vane of a second other said turbine nozzle segment of said plurality of turbine nozzle segments so as to form another of said plurality of nozzle vanes of said turbine nozzle.

34. A method of manufacturing a turbine nozzle as recited in claim 24, wherein the operation of assembling said plurality of turbine nozzle segments comprises assembling said plurality of turbine nozzle segments over a cylindrical mandrel.

35. A method of manufacturing a turbine nozzle as recited in claim 24, wherein for at least one said turbine nozzle segment of said plurality of turbine nozzle segments, the operation of assembling said plurality of turbine nozzle segments comprises at least one of:

a. welding or brazing said first azimuthal boundary of said turbine nozzle segment to said second azimuthal boundary of a first other turbine nozzle segment so as to form one of said plurality of nozzle vanes of said turbine nozzle, or b. welding or brazing said second azimuthal boundary of said turbine nozzle segment to said first azimuthal boundary of a second other turbine nozzle segment so as to form another of said plurality of nozzle vanes of said turbine nozzle.

36. A method of manufacturing a turbine nozzle as recited in claim 24, wherein for at least one said turbine nozzle segment of said plurality of turbine nozzle segments, the operation of assembling said plurality of turbine nozzle segments comprises at least one of:

a. sealing said first azimuthal boundary of said turbine nozzle segment to said second azimuthal boundary of a first other turbine nozzle segment so as to form one of said plurality of nozzle vanes of said turbine nozzle, or b. sealing said second azimuthal boundary of said turbine nozzle segment to said first azimuthal boundary of a second other turbine nozzle segment so as to form another of said plurality of nozzle vanes of said turbine nozzle.

37. A method of manufacturing a turbine nozzle as recited in claim 24, further comprising configuring each of said plurality of turbine nozzle segments so that an outlet thereof is located at and defines a throat of said turbine nozzle.

38. A method of manufacturing a turbine nozzle as recited in claim 24, further comprising inserting at least one impingement liner within an interior of a corresponding at least one said nozzle vane, wherein said at least one impingement liner comprises a plurality of impingement cooling holes through a surface thereof.

39. A method of manufacturing a turbine nozzle as recited in claim 38, further comprising sealing at least substantial portions of radially-outer and radially-inner peripheries of said at least one impingement liner to corresponding portions of said corresponding at least one said nozzle vane.

40. A method of manufacturing a turbine nozzle as recited in claim 38, wherein said at least one impingement liner is inserted within said interior of said corresponding at least one said nozzle vane following the operation of operatively coupling said first portion of said first bounding nozzle vane of said first turbine nozzle segment of said plurality of turbine nozzle segments to said second portion of said second bounding nozzle vane of said second turbine nozzle segment of said plurality of turbine nozzle segments.

41. A method of manufacturing a turbine nozzle as recited in claim 38, wherein said at least one impingement liner is inserted within said interior of said corresponding at least one said nozzle vane adjacent to one of said first portion of said first bounding nozzle vane of said first turbine nozzle segment of said plurality of turbine nozzle segments or said second portion of said second bounding nozzle vane of said second turbine nozzle segment of said plurality of turbine nozzle segments prior to the operation of operatively coupling said first portion of said first bounding nozzle vane of said first turbine nozzle segment of said plurality of turbine nozzle segments to said second portion of said second bounding nozzle vane of said second turbine nozzle segment of said plurality of turbine nozzle segments.

* * * * *

UNITED STATES PATENT AND TRADEMARK OFFICE
CERTIFICATE OF CORRECTION

| | | |
|---|---|---|
| PATENT NO. | : 8,449,249 B2 | Page 1 of 1 |
| APPLICATION NO. | : 12/757946 | |
| DATED | : May 28, 2013 | |
| INVENTOR(S) | : Mark E. Suchezky | |

Figures 12A, 12B:
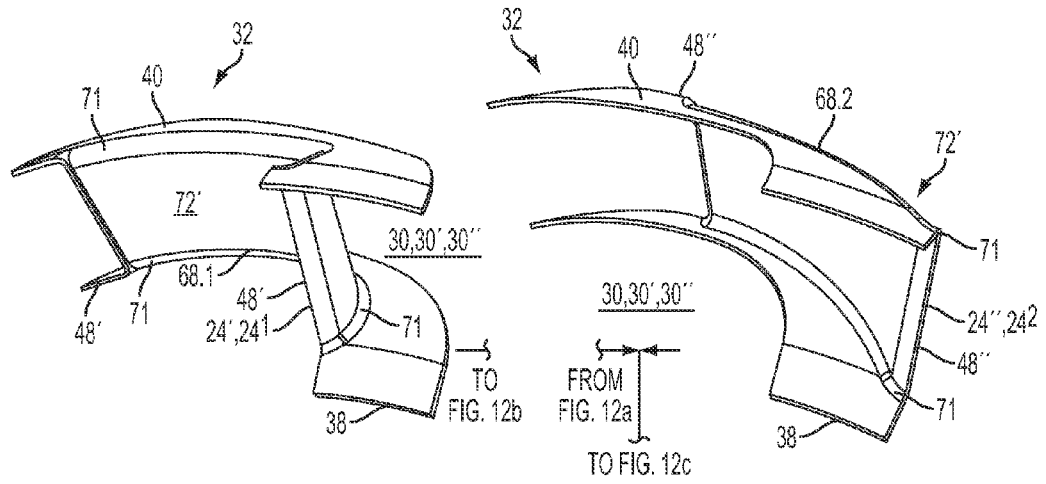
FIG. 12a-c illustrates a second aspect of an associated manufacturing process for manufacturing a circumferential turbine nozzle segment.
Figure 12C:
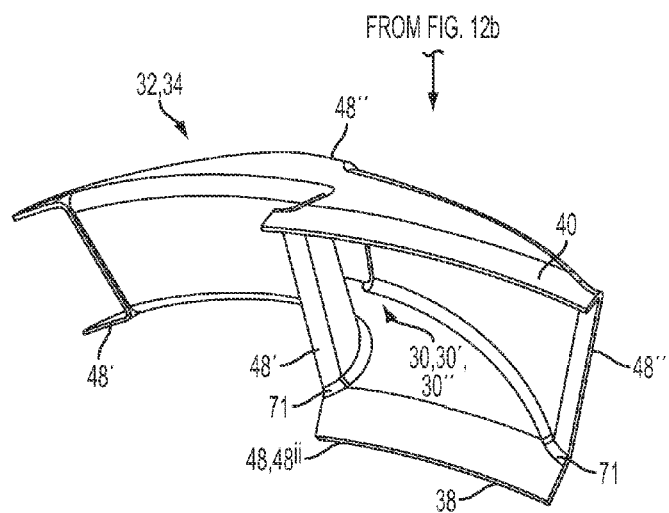

It is certified that error appears in the above-identified patent and that said Letters Patent is hereby corrected as shown below:

In the Specification:

Column 1:
        Line 45, "FIG. 12a-c illustrates" should be changed to --FIGS. 12a-c illustrate--; and
        Line 63, "FIG. 15 or 16" should be changed to --FIGS. 15 or 16--.

Column 4, Line 64, "so a to" should be changed to --so as to--.

In the Claims:

Column 14, Line 63, Claim 30, ";" should be changed to --; or--.

Signed and Sealed this
Twelfth Day of May, 2015

Michelle K. Lee
*Director of the United States Patent and Trademark Office*